Sept. 13, 1949.  G. C. COX  2,481,827
ELECTRODE TERMINAL CONNECTIONS FOR THE ELECTROLYSIS
OF SEAPORT AND RELATED WATERS
Original Filed Aug. 14, 1941
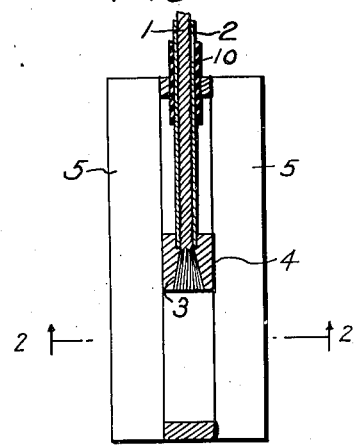
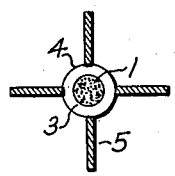
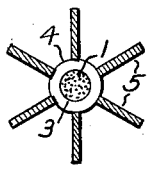
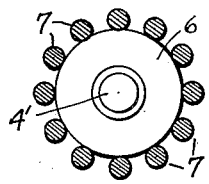
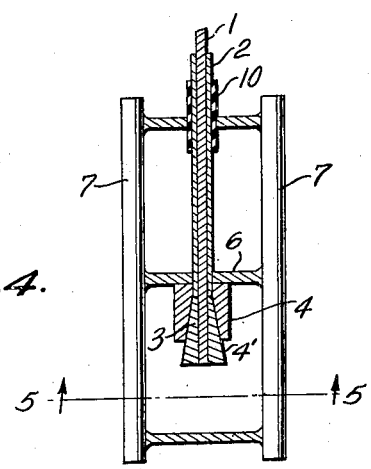
INVENTOR Patented Sept. 13, 1949

2,481,827

UNITED STATES PATENT OFFICE 2,481,827

ELECTRODE TERMINAL CONNECTIONS FOR THE ELECTROLYSIS OF SEAPORT AND RELATED WATERS

George Chandler Cox, Charleston, W. Va.

Original application August 14, 1941, Serial No. 406,900. Divided and this application March 24, 1944, Serial No. 527,986

4 Claims. (Cl. 204—288)

The invention described herein, if patented, may be manufactured and used by or for the Government for governmental purposes without the payment of any royalty thereon.

This invention relates to improved types of cable terminal connection on electrodes, which are submerged in sea, sea port, or brackish waters containing chlorides.

An object of this invention is to produce an improved connection between an electrode for use in decomposing sea, sea port, or brackish waters and one or more cables supplying electric energy to the electrode.

Another object of this invention is to produce a totally submerged type of cable connection for an electrode used for decomposing sea, sea port, or brackish waters which will have a longer useful life than the life of the electrode.

A further object of this invention is to arrange the location of the current dissipating surfaces of an electrode for decomposing sea, sea port, or brackish waters so that the terminal block or cable connection to the electrode will be screened from excessive electrolytic action.

In this spcification Figure 1 is a vertical section of an electrode which has been found to give an excellent screening effect to the cable connection and terminal block. Figure 2 is a cross section along the line 2—2 of Figure 1, showing a four vane type of electrode. Figure 3 is similar to Figure 2 except that the cross section of a six vane electrode is shown. Figure 4 shows a multiple rod type of electrode that gives excellent screening to the terminal block. Figure 5 is a section along the line 5—5 of Figure 4.

Each individual type of electrode connection herein illustrated has been found to give very useful results with one or more of the various processes claimed in my U. S. Patent No. 2,200,469 of May 14, 1940.

In this application brackish water is defined as water which contains chloride ions of any of the inland tidal ports handling ocean or coastwise marine traffic. It is intended that these electrode connections and terminals may be used in electrolytes such as open sea or sea port water, or in water as above defined or any water containing a sufficient amount of calcium and magnesium ions to enable the coating processes set forth in my Patent Number 2,200,469 to be carried out.

In Figures 1 to 5 inclusive, similar members refer to similar parts. I represents an electric cable protected by an insulating covering 2, preferably waterproof. In normal practice the end of the cable is usually soldered or brazed, as shown by 3, to the metal terminal block 4 of the electrode.

Figure 4 shows the use of a two-part terminal block in which the electric cable is soldered or brazed into a tapered pin terminal block 4'. The terminal block 4 contains a tapered hole into which the tapered pin block 4' can be tightly driven. The terminal block 4 will normally have been fastened so as to insure good electrical connection to the proper part of the electrode. The tapered terminal block 4' would normally have the cable soldered or brazed into it before being driven into the coacting block 4. If the angle of the tapered hole and pin is made sufficiently small and accurate a low resistance permanent water tight connection will be made by driving the pin into the block. An advantage of such a connection is its convenience for use in the field.

In Figures 1, 2 and 3 the terminal block 4 of a metallic electrode also constitutes the current-distributing plate and may be welded or otherwise fastened to the fins 5, the surfaces of which constitute the active electrode surfaces. In Figures 4 and 5 the terminal block 4 may be welded, riveted, bolted or held by other means to a current distributing plate 6. This distributing plate may be welded or otherwise fastened to the rods 7, which constitute the active electrode.

When one or more of the electrode assemblies (with or without screening) are constructed of non-metallic materials as graphite, magnetite, etc., the terminal block 4 is generally screwed into the current distributing plate 6 and the electrode rods 7 are also generally screwed into the current distributing plate 6.

Life tests of a 4 vane metal electrode built as shown in Figures 1 and 2 have demonstrated that the terminal block 4 is sufficiently screened from electrolytic action to be in usable condition until the vanes are completely eaten up. However, a construction as shown in Figure 3 using 6 vanes gave a slightly better screening action than that obtained with the 4 vane electrode; an 8 vane electrode gave even better screening than a 6 vane electrode, and so on. A construction similar to that shown in Figures 4 and 5 gave good screening to all metal surfaces inside of the electrode bars 7.

As the number of vanes is increased the dissipating area becomes less because the resistance through the electrolyte to the outer dissipating surfaces is lower than to the inner surfaces. The rod type electrode of Figure 4 and 5 is therefore the outgrowth of a multiple vane electrode in which the surface within the circle tangent to the inside of the rods, as shown in Figure 5, can be effectively screened. Of course the screening action of the inner surfaces becomes more complete as the number of vanes or number of electrodes is increased; however, electrodes which are constructed in accordance with these specifications have given continuous service without maintenance for more than a year. Such low cost labor maintenance is the essence of low cost uses of applicant's U. S. Patent No. 2,200,469 of May 14, 1940.

A covering 10 such as a short piece of rubber hose will prevent abrasion of the cable insulation 2 as well as prevent excessive flexing of the copper cable wires where the cable comes through the upper spacer plate.

This novel and useful means of and apparatus for protecting the terminal block and/or current dissipating head of an electrode which is used for the purposes described consists in reducing the current density on the parts to be protected to a predetermined desired value below that of the dissipating surfaces by causing the current dissipating surfaces to act as a screen by suitably disposing them in space relationship around the parts to be protected.

When desirable for certain uses the electrode rods may be fastened to a central terminal block in such a way that the electrode rods will stick out from one terminal block radially in all directions or radially in one or more planes. This type of electrode gives good screening to the terminal block and allows extremely simple electrode rod replacements to be made.

It is often useful to have the terminal block 4 of greater diameter than any of the electrode rods. In such a case imperfect screening or shielding can be allowed and still obtain a greater useful life of the terminal block than the electrode rods or bars.

When desired two or more terminal blocks may be used on one electrode.

Furthermore, I have found that the combination of the above species into the design of an electrode terminal cable connection for use in sea, sea port, or brackish water electrolysis often gives a type of connection more exactly adapted to some specific application than the use of any one species. The illustrated species are all considered to fulfill the basic essential requirement of supplying an electric current to an efficient long life electrode for decomposing sea, sea port, and related waters. These requirements are: (a) constant low contact resistance of a cable connection during the useful life of an electrode, (b) long life of the connection without attention, (c) low initial cost and maintenance, and (d) simplicity of installation.

The expression "screening" as used herein is intended to mean a current blocking action resulting from the positioning of the electrode vanes or rods adjacent one another about the cable terminal. The lines of electrolytic current distribution which flow laterally from each electrode vane or rod toward the adjacent electrode vanes or rods crowd each other and tend to flow outwardly, resulting in very little electrolytic current adjacent the cable terminal. Thus, the mutual effect of the electrode vanes or rods is a screening effect which protects the cable terminal from excessive electrolytic current and consequent deterioration.

This application is a division of my application for "Electrode terminal connections for the electrolysis of seaport and related waters," filed August 14, 1941, Serial No. 406,900, now abandoned.

I claim:

1. An anode for electrolytic apparatus comprising an annular electrically conductive plate, an insulated lead-in cable extending through the central hole of the annular plate and electrically and mechanically connected to the under side of the plate, and a plurality of elongated electrodes secured intermediate their ends to the annular plate around the periphery thereof, each said electrode being equally spaced from proximal electrodes and extending transversely of the plate, whereby to screen the connection of the cable to the plate from excessive electrolytic current.

2. Structure as in claim 1 wherein the electrodes comprise vanes whose longitudinal extent is substantially perpendicular to the plate and whose lateral extent is substantially radially outward from the plate.

3. Structure as in claim 1 wherein the connection of the lead-in cable to the plate is separable.

4. Structure as in claim 3 wherein said separable connection comprises a tapered socket fixed to the under side of the annular plate and a cooperatively tapered plug attached to the bared extremity of the lead-in cable and receivable in said socket.

GEORGE CHANDLER COX.

REFERENCES CITED

The following references are of record in the file of this patent:

UNITED STATES PATENTS

| Number | Name | Date |
|---|---|---|
| 507,374 | Lyte | Oct. 24, 1893 |
| 508,091 | Cutten | Nov. 7, 1893 |
| 658,391 | Carmichael | Oct. 2, 1900 |
| 1,467,060 | Munning | Sept. 4, 1923 |
| 1,481,648 | Levin | Jan. 22, 1924 |
| 1,709,523 | Delavie | Apr. 16, 1929 |
| 1,910,044 | Parker | May 23, 1933 |
| 2,177,453 | Donald | Oct. 24, 1939 |
| 2,315,897 | Hansell | Apr. 6, 1943 |
| 2,319,624 | Olsen | May 18, 1943 |
| 2,323,952 | Wick | July 13, 1943 |

OTHER REFERENCES

"Electroplating with Chromium, Copper, and Nickel," by Freeman, Prentice-Hall, Inc., New York, 1930, page 128.